(12) United States Patent
Boyd et al.

(10) Patent No.: US 11,932,776 B2
(45) Date of Patent: Mar. 19, 2024

(54) SOLVENT-BASED COMPOSTABLE COLD SEAL RELEASE LACQUER

(71) Applicant: SUN CHEMICAL CORPORATION, Parsippany, NJ (US)

(72) Inventors: Craig Boyd, Northlake, IL (US); Gina Chavez, Northlake, IL (US); Mackensey Fagan, Northlake, IL (US)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 18/000,316

(22) PCT Filed: Jun. 30, 2021

(86) PCT No.: PCT/US2021/039754
§ 371 (c)(1),
(2) Date: Nov. 30, 2022

(87) PCT Pub. No.: WO2022/006199
PCT Pub. Date: Jan. 6, 2022

(65) Prior Publication Data
US 2023/0193078 A1    Jun. 22, 2023

Related U.S. Application Data

(60) Provisional application No. 63/172,130, filed on Apr. 8, 2021, provisional application No. 63/045,917, filed on Jun. 30, 2020.

(51) Int. Cl.
C09D 193/00    (2006.01)
C09D 7/20    (2018.01)
(Continued)

(52) U.S. Cl.
CPC ............. *C09D 193/00* (2013.01); *C09D 7/20* (2018.01); *C09D 7/65* (2018.01); *C09D 17/00* (2013.01);
(Continued)

(58) Field of Classification Search
CPC ..... C08L 91/06; C09D 177/00; C09D 193/00; C09D 7/20; C09D 7/65; C09J 193/00;
(Continued)

(56) References Cited

U.S. PATENT DOCUMENTS 5,314,944 A    5/1994 Chao
5,466,734 A * 11/1995 Catena ................... C08G 69/28
524/428

(Continued)

FOREIGN PATENT DOCUMENTS

EP    2 886 581 A1    6/2015
WO    WO 2019/067005 A1    4/2019

OTHER PUBLICATIONS

International Search Report issued in International Application No. PCT/US2021/039754, dated Oct. 19, 2021.
(Continued)

*Primary Examiner* — Frances Tischler
(74) *Attorney, Agent, or Firm* — Marian E. Fundytus; Ostrolenk Faber LLP

(57) ABSTRACT

The present invention provides solvent-based compostable cold seal release lacquers for use in packaging structures. The lacquers of the invention comprise resins, such as polyamide resins, comprising greater than 90% biobased carbon, generally prepared from renewable sources, e.g., plants such as rice. The present invention also provides the use of the inventive compostable lacquers as cold seal release lacquers in cold seal packaging, along with eco-
(Continued)

OPV's including CRLS's

Film #2

Laminating Adhesive

Inks

Primer (Optional)

Film #1

Cohesive/Adhesive friendly packaging film, etc., and has the potential to make the cold seal packaging fully compostable.

22 Claims, 1 Drawing Sheet

(51) Int. Cl.
| | | |
|---|---|---|
| C09D 7/65 | (2018.01) | |
| C09D 17/00 | (2006.01) | |
| C09D 177/00 | (2006.01) | |
| C09J 7/20 | (2018.01) | |
| C09J 7/40 | (2018.01) | |
| C09J 193/00 | (2006.01) | |

(52) U.S. Cl.
CPC ............... *C09J 7/201* (2018.01); *C09J 7/401* (2018.01); *C09J 193/00* (2013.01); *C09J 2301/208* (2020.08); *C09J 2301/502* (2020.08); *C09J 2401/006* (2013.01); *C09J 2477/005* (2013.01); *C09J 2491/005* (2013.01)

(58) Field of Classification Search
CPC ............ C09J 2301/208; C09J 2301/502; C09J 2401/006; C09J 2477/005; C09J 2491/005; C09J 7/201; C09J 7/401
See application file for complete search history.

(56) References Cited

U.S. PATENT DOCUMENTS

| | | | | |
|---|---|---|---|---|
| 5,948,709 | A * | 9/1999 | Paul | D04H 1/587 |
| | | | | 604/385.24 |
| 6,099,682 | A | 8/2000 | Krampe et al. | |
| 6,613,831 | B1 | 9/2003 | Bentley et al. | |
| 7,695,809 | B1 | 4/2010 | Fuller | |
| 2005/0031233 | A1 | 2/2005 | Varanese et al. | |
| 2011/0229700 | A1 * | 9/2011 | Troutman | C08B 31/04 |
| | | | | 427/256 |
| 2014/0099455 | A1 * | 4/2014 | Stanley | B32B 27/36 |
| | | | | 428/34.3 |
| 2017/0216880 | A1 * | 8/2017 | Majszak | B05D 7/26 |
| 2020/0248038 | A1 * | 8/2020 | Stufflebeam, Jr. | B32B 27/36 |

OTHER PUBLICATIONS

Written Opinion of the International Searching Authority issued in International Application No. PCT/US2021/039754, dated Oct. 19, 2021.
Written Opinion of the International Preliminary Examining Authority issued in International Application No. PCT/US2021/039754, dated Jul. 8, 2022.
International Preliminary Report on Patentability (Chapter 1 of the Patent Cooperation Treaty) issued in International Application No. PCT/US2021/039754, dated Oct. 19, 2021.
Basf: "Printing & Packaging, resins & performance additives", Dec. 1, 2013, pp. 1-20, XP055849765, Retrieved from the Internet: URL:https://dispersions-resins.basf.com/global/en/performance and formulation additives/industries/additive-for-printiFig_pack aging. html [retrieved on Oct. 11, 2021].
Basf: "Resins and Performance Additives for printing & packaging industries", Sep. 9, 2011, XP055374375, Retrieved from the Internet: URL:http://product-finder.basf.com/group/corporate/product-finder/en/literature-document:/Brand+Darocur-Brochure--Resins+and+Performance+Additives+for+printing+packaging+industries-English.pdf [retrieved on May 19, 2017] pp. 14, 15; examples V930, V940.
Cognis: "Cognis offers Versamid 757", ink world, Dec. 1, 2009, pp. 1-4, XP055849736, Retrieved from the Internet: URL:https://www.thefreelibrary.com/Cognis+offers+Versamid+757.-a0215395510 [retrieved on Oct. 11, 2021] the whole document.

* cited by examiner

| OPV's including CSRL's |
|---|
| Inks |
| Primer (if used) |
| Film |
| Cohesive/adhesive |

FIGURE 1

| OPV's including CRLS's |
|---|
| Film #2 |
| Laminating Adhesive |
| Inks |
| Primer (Optional) |
| Film #1 |
| Cohesive/Adhesive |

FIGURE 2

SOLVENT-BASED COMPOSTABLE COLD SEAL RELEASE LACQUER

CROSS REFERENCE TO RELATED APPLICATIONS

The present application is a § 371 National Phase application based on PCT/US2021/039754 filed Jun. 30, 2021, which claims the benefit of U.S. Provisional Application Nos. 63/045,917, filed Jun. 30, 2020 and 63/172,130, filed Apr. 8, 2021 the subject matter of each of which is incorporated by reference in their entirety.

FIELD OF THE INVENTION

The present invention provides a solvent based lacquer, useful as a release lacquer in cold seal packaging, which lacquer is compostable. The compostable lacquer of the invention, made from renewable sources, e.g., rice oil, rice bran, etc., supplies a missing bio-renewable element to cold seal packaging, that may provide the final piece needed to prepare a fully compostable cold seal package.

BACKGROUND OF THE INVENTION

Eco-friendly and renewable packaging has become very important in the packaging market. As a result, the film packaging industry is replacing conventional films with compostable films that are based on bio-renewable raw materials. A compostable material is one that breaks down fully in a specific amount of time under certain conditions. However, the package itself can only be deemed compostable if the entire structure is comprised of compostable materials. Therefore, the demand from the packaging industry for compostable inks and coatings is growing.

The present invention addresses the lack of compostable coatings in certain packaging applications, for example, cold seal release coatings in cold seal packaging. In cold seal packaging, a seal, typically comprising an adhesive, holding two sections of the packaging together is formed with pressure and without using heat. In many cold seal applications the seal is strong enough to hold the packaging closed during general handling and storage, but can be pulled apart without substantial damage to the packaging or its contents. Typically, the two sections of the cold seal cannot be resealed once the seal is opened.

In one common way to form a cold seal, an adhesive, e.g., a contact adhesive, is applied to one or both of the two packaging sections, which are then pressed together so that the adhesive applied to one surface contacts the second surface, or an adhesive or other substance that has been applied to the second surface. The substances applied to the two sections of packaging can comprise the same material or different materials.

Cold seals can be used for a variety of applications. In some cases it may be more desirable for the seal to form a strong, more permanent bond so that the packaging sections are not as readily pulled apart. Cold seals that can be resealed after opening are also known. However, many applications call for cold seal packaging that is readily opened and does not reseal.

Typically, to obtain the desirable sealing and opening properties, a cold seal release lacquer, (CSRL) is used. A cold seal release lacquer is a coating that contacts a cold seal adhesive or cohesive during formation of the seal. A major function of a CSRL is to ensure that the cold seal bond will open readily on demand, without interfering with the formation of a seal bond having adequate strength to maintain the seal under normal handling. These lacquers are often found printed on substrate films for snack foods, medical equipment etc., where heat can be detrimental to the contents of the product and easy opening is desired. One example being a snack product where a consumer opens the package by pulling apart the opposing sides of the package.

A variety of cold seal adhesives have been developed for different applications, and they differ from each other, in some cases considerably, in terms of their composition and properties. Consequently, the requirements with which release varnishes and release films must comply also vary.

For example, U.S. Pat. No. 6,099,682 discloses a cold seal package particularly well-suited for aseptic delivery of packaged goods, such as bandages, dressings, and the like. The package comprises constructions wherein two packaging substrates, or two portions of one substrate, are sealingly engaged to one another using a contact adhesive, wherein the two substrates can be easily peeled apart without substantial damage to the substrates and which substrates cannot typically be resealed once peeled apart. Disclosed are contact adhesives comprising a polychloroprene, a polyurethane, a styrene-isoprene copolymer, a styrene-butadiene copolymer, a polyimide, a polyvinyl chloride, a nitrocellulose, a polyisoprene, an acrylonitrile-butadiene-isoprene terpolymer, a butadiene-methacrylonitrile copolymer, a polyethylene-vinyl acetate copolymer, and a polyacrylate.

Also disclosed are release coatings comprising an ethyl acrylate-acrylonitrile copolymer, an acrylic acid-alkyl acrylate copolymer, a polyvinyl chloride resin, a polyvinyl N-octadecyl carbamate, a polyethylene based wax, a polyamide based wax, a polysiloxane, a fluorocarbon polymer, a polyvinyl ester, a polyethylene imine, an alkyl substituted amine, a chromium complex, and a fatty acid based wax. One particularly preferred release coating is formed from an aqueous polyamide dispersion. Despite this variety in release coatings, none are reported to be compostable.

U.S. Pat. No. 6,613,831 discloses a cold seal adhesive comprising an adhesive emulsion composition comprising: a) 10 to 74 wt % of cis-1,4-polyisoprene; b) 0.4 to 60 wt % of a further polymer comprising one or more polymers selected from acrylic monomers; vinyl acetate monomers; copolymers of acrylics; copolymers containing vinyl acetate; chlorinated rubbers; and mixtures thereof, c) from about 0.05 to about 0.3 wt % of an emulsion stabilizer; and d) water.

U.S. Pat. No. 5,314,944 discloses a pressure sensitive adhesive that is tack-free to the touch, but forms a permanent bond under moderate pressure. The pressure sensitive adhesive contains a tacky adhesive latex, generally an acrylic type adhesive latex, a non-tacky latex or polymer, which may be an acrylate latex or a styrene-butadiene latex or a non-tacky polymer such as polyvinyl alcohol, starch and cellulose derivatives.

The adhesive/cohesive coated substrates must also resist blocking when supplied as a consolidated article such as roll-good or layered sheets. Often, an adhesive coated surface is in contact with the non-adhesive surface of the substrate, i.e., a release layer, when rolled or stacked.

U.S. Pat. No. 7,695,809 discloses a method of preparing adhesive coated articles and cold seal bonded laminates, wherein certain polychloroprene based adhesive compositions are used to form adhesive coated substrates that are non-blocking and pressure sealable at ambient temperature.

U.S. Pat. No. 5,466,734 discloses an aqueous cold seal release varnish comprising a $C_{1-4}$ alkanol, water, a surfactant, and the reaction product of a mixture comprising 30-50 parts of a polyamide block copolymer having an acid value of 30-45, 1-5 parts of an amide wax, 10-20 parts of at least one $C_{1-4}$ alkanol, 5-10 parts of an amine and 15-55 parts of water, which reaction product is mixed with $C_{1-4}$ alkanol, water and a surfactant.

EP20130198697 discloses a release lacquer comprising a polyamide resin, which resin comprises a main structural unit derived from at least one dimeric $C_{10-30}$ carboxylic acid and at least one polyamine, preferably selected from the group consisting of diamines and triamines, and at least one polyorganosiloxane moiety covalently linked to said at least one main structural unit.

Compostability encompasses three factors: biodegradability, disintegration, and ecotoxicity. Biodegradability shows quantitatively the inherent nature of the material to be consumed by microorganisms. Biodegradability protects the environment by preventing the material from accumulating. Disintegration measures whether the material breaks down and falls apart, thereby protecting the compost plant operator. The material may or may not be biodegrading. Ecotoxicity testing determines whether the material shows any inhibition on plant growth, or the survival of soil or aquatic fauna, after composting.

ASTM D6400 is the industrial standard for solid material biodegradation required for plastics designed to be aerobically composted in municipal or industrial facilities. One aspect of the ASTM D6400 standard, as applied to the present invention, provides that if a finished coating, e.g., a CSRL, or if the sum of the individual components in their compositional ratios is >90% biobased carbon, the product is inherently biodegradable and presumed to satisfy ASTM D6400.

However, there are currently no compostable cold seal release lacquers (CSRL's).

Presently, CSRL's are based on conventionally sourced polyamides and synthetic waxes, none of which are compostable. Cold seal release lacquers are available that provide a wide range of properties that fit customer specifications, e.g., a matte or glossy finish. The customer may ask for a CSRL to be Nestle compliant for food contact or request differing CoF depending on the application. The CSRL must meet these customer needs and provide exceptional release properties to the cold seal cohesives. In many applications the CRSL must provide anti-blocking activity at various stages in the packaging preparation or use. For example, the CSRL is often in direct contact with the cold seal cohesive in the rewind after the printing has concluded and prior to film converting. The lack of compostable CSRL's has thus far prevented the development of a fully compostable packaging product, which the present invention aims to correct.

While polymers, including adhesives and coating resins materials, based on natural sources are known, it is also known that many are not compatible with certain end uses. For example, as pointed out in ILSI Europe Report Series Packaging Materials: 10, Adhesives for Food packaging Applications, Monika Toenniessen October 2018, Bio-based resins are typically easily biodegradable, which is often an important aspect for why they are chosen for use when environmental impacts are a significant concern, for example waste water treatment and waste paper recycling. As a consequence of this, it is known that many adhesives based on natural polymers have poor ageing resistance. This further complicates development of the correct bio-based lacquer for the present cold seal application.

Applicant has discovered a cold seal release lacquer comprising bio-sourced polyamide resins that meets all technical demands of cold seal packaging, including ageing resistance, and which lacquer is compostable.

Citation or identification of any document in this application is not an admission that such represents prior art to the present invention.

SUMMARY OF THE INVENTION

In one embodiment the invention provides a solvent-based cold seal release lacquer comprising:
  a) one or more solvents;
  b) from 20 to 70 wt % of one or more polyamide resins comprising greater than 90% biobased carbon; and
  c) from 0.25-5 wt % of one or more waxes, e.g., waxes comprising greater than 70% biobased carbon;
wherein the cold seal release lacquer has a static coefficient of friction ($CoF_{static}$) of 0.30-0.60; a kinetic coefficient of friction ($CoF_{kinetic}$) of 0.17-0.40;
and wherein the cold seal release lacquer, when dried, comprises greater than 90% biobased carbon and is compostable.

In many embodiments the one or more solvents are chosen from the group consisting of alcohols, aliphatic solvents, glycol ethers and blends thereof. In some embodiments, when a wax is present in an amount of greater than 1 wt % then the wax comprises greater than 70% biobased carbon.

In general, the one or more polyamide resins comprising greater than 90% biobased carbon of the cold seal release lacquer are derived from natural materials. For example, the one or more polyamide resins are derived from rice oil or rice bran. In some embodiments the one or more polyamide resins are themselves compostable.

In another broad embodiment, the present invention provides a structure comprising a substrate, a cohesive and the cold seal release lacquer above.

Typically, the packaging structure of this embodiment is printed with a compostable ink, either directly onto a surface of the substrate or onto a primer layer adhering to a surface of the substrate. In many cases, the substrate of the structure is a film, often a cellulosic film, and in many embodiments the substrate and the cohesive are also compostable.

In certain embodiments the structure includes a laminating substrate positioned over the ink and in particular cases the cold seal release lacquer is positioned over the laminating substrate.

In another embodiment, the cohesive of the structure comprises one or more polyamide resins comprising greater than 90% biobased carbon. In some embodiments the polyamide resins are themselves compostable. Often the one or more polyamide resins comprising greater than 90% biobased carbon are derived from natural sources, such as rice oil or rice bran. In one embodiment the entire structure is compostable.

The invention also provides a method of preparing a compostable structure comprising the compostable cold seal release lacquer, compostable substrate and a compostable cohesive above, the method comprising the steps of: applying a cohesive, preferably a compostable adhesive, to a surface of a packaging substrate, preferably a compostable substrate, and applying a compostable cold seal release lacquer of the invention to a second surface of the same substrate or a surface of a second packaging substrate, also preferably a compostable substrate, wherein the cohesive and compostable cold seal release lacquer form a seal under pressure, which seal is readily opened.

BRIEF DESCRIPTION OF THE DRAWINGS

FIG. 1 shows a schematic of a surface printing construct of the present invention.

FIG. 2 shows a schematic of a laminated print construct of the present invention.

DETAILED DESCRIPTION OF THE INVENTION

The present invention provides compostable CSRL technology that will allow an entire structure (ink, coating, and film) to be completely compostable according to ASTM D6400 certification (equivalent to ISO17088). One embodiment of the invention provides compostable lacquers and another embodiment uses these compostable CSRL's in conjunction with compostable films and printing inks to provide a complete printed construct that is compostable.

In one embodiment, the invention provides a compostable solvent-based lacquer, in particular, a compostable solvent based cold seal release lacquer, comprising one or more resins, such as polyamide resins comprising greater than 90% biobased carbon, prepared from natural sources which may include, e.g., rice bran, rice oil, amino acids, fatty acid glycerides and starches.

In another embodiment, the invention provides cold seal packing which is largely or completely compostable comprising a compostable solvent based cold seal release lacquer and a method of preparing cold seal packaging using the inventive cold seal release lacquer.

It is to be understood that the foregoing general description and the following detailed description are exemplary and explanatory only, and are not restrictive of any subject matter claimed.

Headings are used solely for organizational purposes, and are not intended to limit the invention in any way.

Unless otherwise defined, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose. Although any methods and materials similar or equivalent to those described herein can be used in the practice or testing of the present invention, the preferred methods are described.

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

As used herein, "substrate" means any surface or object to which an ink or coating can be applied. Substrates include, but are not limited to, paper, fabric, leather, textiles, felt, concrete, masonry, stone, plastic, plastic or polymer film, glass, ceramic, metal, wood, composites, combinations thereof, and the like. Substrates may have one or more layers of metals or metal oxides, or other inorganic materials.

As used herein "article" or "articles" means a substrate or product of manufacture. Examples of articles include, but are not limited to: substrates such as paper, fabric, leather, textiles, felt, concrete, masonry, stone, plastic, plastic or polymer film, glass, ceramic, metal, wood, composites, and the like; and products of manufacture such as publications (e.g. brochures), labels, and packaging materials (e.g. cardboard sheet or corrugated board), containers (e.g. bottles, cans), clothing, a polyolefin (e.g. polyethylene or polypropylene), a polyester (e.g. polyethylene terephthalate), a metalized foil (e.g. laminated aluminum foil), metalized polyester, a metal container, and the like.

As used herein, the terms "inks and/or coatings," "inks and coatings," "inks or coatings," "inks," and "coatings" are used interchangeably.

As used herein, "cohesive" refers to a substance, applied to either or both of the two substrates to be held together by the cold seal, that either alone or in combination with another substance, e.g., another cohesive, has adhesive properties and which substance takes part in forming the cold seal.

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended. It is to be understood that wherein a numerical range is recited, it includes the end points, all values within that range, and all narrower ranges within that range, whether specifically recited or not.

As used herein, compostability is the property whereby a material is 1) biodegradable, i.e., it has an inherent tendency to be consumed by microorganisms, 2) subject to disintegration, i.e., the material physically breaks down during aging while exposed to certain environmental conditions, and 3) not ecotoxic, i.e., does not show signs of any inhibition on plant growth, or the survival of soil or aquatic fauna, after composting.

As used herein, biobased carbon means that carbon present in carbon containing materials originates from recently living sources (naturally derived materials) as opposed to materials originating from ancient carbon such as petroleum and coal.

Cold Seal Release Lacquer and Methods of Use

The lacquer of the invention is a solvent-based cold seal release lacquer comprising one or more polyamide resins comprising greater than 90% biobased carbon and one or more solvents. In one embodiment the invention provides a solvent-based cold seal release lacquer comprising:
  a) one or more solvents;
  b) from 20 to 70 wt %, e.g., 20-50%, e.g., 25-35%, of one or more polyamide resins comprising greater than 90% biobased carbon; and
  c) from 0.25-5 wt %, e.g., 0.25-3%, e.g., 0.25-1%.

The cold seal release lacquer compositions of the present invention typically comprise about 20 wt % to about 70 wt % polyamide resins comprising greater than 90% biobased carbon, based on the total weight of the composition. For example, in some embodiments, the cold seal release lacquer compositions comprise about 20 wt % to about 50 wt % polyamide resins comprising greater than 90% biobased carbon, for example, about 25 wt % to about 35 wt % polyamide resins comprising greater than 90% biobased carbon, based on the total weight of the composition.

The polyamides of the lacquer, when dried, comprise greater than 90% biobased carbon, and are typically made from materials derived from natural sources such as plants. For example, materials used in preparing compostable polymers in the present invention can include wood, starches, sugars, amino acids, fatty acids, fatty acid esters, etc., which can be sourced, for example, from rice bran, rice oil, etc. For example, components of the one or more compostable polyamide resins may be derived from rice oil or rice bran. Useful, commercially available polyamides include, but are not limited to, e.g., the Vegechem products from TSUNO, e.g., Vegechem V930. Other suitable compostable polyamides include, e.g., Vegechem Green V335, Vegechem Green V550, Vegechem Green 725, Vegechem Green V744, Vegechem Green V759 and Vegechem V59D, Unirez 2930 from KRAYTON, and Versamid products from BASF, e.g., Versamid 930, Versamid 940, and Versamid 757.

The cold seal release lacquer compositions of the present invention typically comprise about 0.25 wt % to about 5 wt % one or more waxes, based on the total weight of the composition. For example, in some embodiments, the cold seal release lacquer compositions comprise about 0.25 wt % to about 3 wt % one or more waxes, for example, about 0.25 wt % to about 1 wt %, one or more waxes, based on the total weight of the composition. Waxes that are present in an amount of greater than 1 wt % comprise greater than 70% biobased carbon.

Suitable waxes include, but are not limited to, amide wax, erucamide wax, polypropylene wax, paraffin wax, polyethylene wax, polytetrafluoroethylene wax, carnauba wax, soybean wax, and combinations thereof. Compostable waxes useful in the invention include, but are not limited to, e.g., S-Nauba 5021 from Shamrock Technologies. Other suitable waxes include, e.g., Ceracol 609N, Cerefak 140N and Cereflour 1000 from BYK; Deurex 52G from Deurex; Carnauba Wax, Candelilla Real, Multiceras Beeswax, and Candeuba wax from MULTICERAS; Finawax E from FINE ORGANIC INDUSTRIES; Micromide 520 from MICRO POWDERS; and Crodamine ER and Crodamide SR from CRODA Polymer Additives.

The cold seal release lacquer compositions of the present invention typically comprise about 30 wt % to about 90 wt % one or more solvents, based on the total weight of the composition. For example, in some embodiments, the cold seal release lacquer compositions comprise about 50 wt % to about 80 wt % one or more solvents, for example, about 65 wt % to about 75 wt %, one or more solvents, based on the total weight of the composition.

Typical solvents and their concentrations include:
10-50% alcohol solvent (e.g., ethanol, n-propanol, IPA);
10-50% aliphatic solvent (e.g., heptane, naphtha, octane, hexane); and, optionally,
0-15% slow (high viscosity) solvent (e.g., glycol ethers).

Typically, the one or more solvents are organic solvents selected from the group consisting of alcohols, aliphatic solvents, glycol ethers and blends thereof. For example, an alcohol solvent may comprise ethanol, n-propanol, isopropanol and the like; an aliphatic solvent may comprise hexane, heptane, octane, naphtha, and the like, etc. A small amount of water may be present, for example, as a additive as described below or an incidental amount may be introduced with a solvent such as ethanol. In the present application, water is not treated as a solvent.

When considering compostability of the lacquer, it should be noted that since the solvents are driven off during the drying process, they are not part of the final printed and coated construct and thus are not required to be compostable in and of themselves.

The lacquer may comprise additives as known in the field, e.g., crosslinkers, slip agents, matting agents, viscosity stabilizers, e.g., water, and the like. The additives will be present in total at about from 0.1 wt % to 15 wt % of the lacquer. In particular embodiments, a cross linker e.g., Sun adhesion promoter, Lupasol FT WF, etc, may be present in an amount of 0.2-0.85%, and/or a slip agent, e.g., Disperbyk 111 from BYK, Low Angle 5413 from Shamrock Technologies, etc., may be present in an amount of 0-1%, and/or matting agents, e.g., Ceraflour 1000 BYK, Sylysia 320 from Fuji Sylysia Chemical, PERGOPAK M5 from Huber Engineered Materials, LoAngle 5413 from Shamrock Technologies, etc., may be present in an amount up to 11%; and/or a viscosity stabilizer such as water may be present in an amount of up to 1%. It is understood that the additives would either be compostable by themselves or added under the cumulative critical threshold to retain compostability.

A preferred solids % for the lacquer is in the range of 10-70% based on the total weight of the lacquer, more preferably 20-50%, and most preferably 25-35%.

For some applications, coefficient of friction (CoF) is an important feature because it allows for the proper processing of the package during the packing and filling process. CoF can be controlled by the use of various materials and additives. In the present invention, wax was used, but examples of other materials that could be used include slip agents, silicone, and the like. The cold seal release lacquer of the invention has a static coefficient of friction ($CoF_{static}$) of 0.30-0.60, e.g., 0.35-0.50 or 0.43-0.48; and kinetic coefficient of friction ($CoF_{kinetic}$) of 0.17-0.40, e.g., 0.20-0.35 or 0.25-0.30.

Compostability

Currently there are no compostable cold seal release lacquers (CSRL's). The invention provides a compostable cold seal release lacquer that is compostable and made from renewable sources that can be used on various films. There is no specific limitation to the films that would be suitable for use with the CSRL's of the present invention, e.g., thermoplastic or cellulose based materials, though in a preferred embodiment, the films would be compostable to provide a completely compostable print structure (e.g., a packaging structure).

The invention also provides cold seal packaging wherein the compostable lacquer of the invention is a release layer of the cold seal. In a particular embodiment, the packaging is fully compostable.

A compostable material is one that breaks down fully in a specific amount of time under certain conditions. ASTM D6400 is the industrial standard for solid material biodegradation and provides the requirements that must be met in order to make the claim of compostability for a wide range of industrial and consumer products, such as plastics designed to be aerobically composted in municipal or industrial facilities.

ASTM D6400 is relevant for inks, coatings, and adhesives designed to be applied to all types of films and film structures including surface and laminates for end use packaging products designed to be aerobically composted. Coatings and adhesives for compostable film structures requiring ASTM compliance need a separate biodegeneration test for each organic component present in the final packaging structure at a percentage >1% and <10% in dry weight. The coating/adhesive and organic components requiring the biodegradation must prove to be inherently biodegradable up to a certain application percent. The conditions for approval for ASTM D6400 are as follows:

All conditions must be satisfied within 180 days.
90% of the organic carbon is to convert to $CO_2$. The whole item can be tested or any individual components that are >1% of the dry weight of the whole item.
Components between 1-10% must be tested individually.
Organic components <1% are exempt provided the sum of all organic components <5%.

ASTM D6866-20 radiocarbon test methods were used to verify the bio-based carbon content satisfied ASTM D6400. Individual components and finished coating samples were subjected to radiocarbon ($^{14}C$) biobased product testing. This test uses accelerator mass spectrometry (AMS) to measure total organic carbon only. Results are reported as % biobased carbon which indicates the percentage of carbon derived from natural (plant or animal by-product) vs synthetic (petrochemical). If the finished coating or the sum of the individual components in their compositional ratios is >90% biobased carbon the product is inherently biodegradable and is thus presumed to satisfy ASTM D6400

As used herein, bio-renewable carbon or biobased carbon can also be defined as non-ancient carbon that is part of earth's natural environment. Non-ancient carbon contains measurable amounts of radioactive carbon ($^{14}C$), the radioactivity of which is depleted after about 40,000 years after final atmospheric carbon incorporation. Ancient fossil-based carbon from a source over 40,000 years old, such as carbon from petroleum deposits, does not contain $^{14}C$. Bio-renewable carbon refers to naturally occurring renewable resources that can be replenished to replace the portion depleted by usage and consumption, either through natural reproduction, or other recurring processes in a finite amount of time (such as within a human lifetime).

The bio-based carbon content (BRC) is determined using the standard method described in ASTM D6866 ("Standard Test Methods for Determining the Biobased Content of Natural Range Materials Using Radiocarbon and Isotope Ratio Mass Spectrometry Analysis"). See "Understanding biobased carbon content," Society of the Plastics Industry Bioplastics Council (February 2012). The application of ASTM D6866 to measure "bio-based content" is based on the same concepts as radiocarbon dating, but without using the age equations. The ratio of the amount of radiocarbon ($^{14}C$) in an unknown sample to that of a modern reference standard is determined. Fossil carbon contains no radiocarbon. The greater the amount of "new" carbon, the higher $^{14}C$. The ratio is reported as a percentage of the total carbon that is modern carbon, with the units "pMC" (percent modern carbon), or BRC (as a percentage). Some suppliers may assess a percentage of biobased content based on weight, based on the "recipe" the producer uses (i.e., how much of a natural material, such as cellulose, is present in a varnish containing cellulose and copolyester). However, it should be noted that the weight percent includes not just the contribution to the weight from the carbon, but also from the other elements in the materials. For the purposes of the present invention, the BRC content refers to the BRC as assessed using ASTM D6866.

Cold Seal Packaging

In one embodiment, the film of the packaging is food contact compliant. One such film that meets the preceding criteria, compostability and food compliant, is 335 NVS film (Futamura), a cellulosic film based on renewable resources, which was used in the testing of the compostable CSRL's of the present invention. The films, in conjunction with the CSRL's of the present invention, would also preferably provide sufficient release properties without any ink transfer.

In the service life of cold seal packaging there is more than one type of release to consider, but all are judged on the same release scale. In a preferred embodiment, the cold seal release lacquer would exhibit a rating of 1-3 after block testing (see Table 1 in the Examples) to pull prints apart because this represents the tension when unwinding a finished print roll at the printer or converter. In less common applications a rating of 4 or even 5 would be deemed acceptable or even desirable, but these would be less preferred for the purposes of the present invention. After the CS (cold seal or the cohesive portion of the cold seal) is pulled from the cold seal release lacquer the cohesive is folded in half so that it comes into contact with itself. The print is then pulled apart and the CS-CS release bond strength, that is, the strength of cohesive to itself or another cohesive, is measured. In a preferred embodiment the cohesive would exhibit a rating above 5 as this represents no contamination of the cohesive by the cold seal release lacquer or other outside factors.

An acceptable cold seal cohesive should exhibit CS-CS bond strength after aging that is no lower than 80% of the initial (green) value. In a preferred embodiment, the bond strength after block testing would be the same or higher than the green bond strength. The CS-CSRL and CS-CS bond strengths will vary depending on the specific cold seal cohesive, substrate and the cohesive application weight.

The compostable CSRL of the invention will allow for fully compostable cold seal packaging. There are various configurations to construct a packaging product. The most common are surface printing and laminated structures. Surface printing is more economical, creates less waste, and can be converted quickly. The structure for surface printing is shown in FIG. 1. In this structure, both the ink and OPV/CRSL (over print varnish/cold seal release lacquer) may encounter the cohesive/adhesive in the rewind.

Lamination structures, while considerably more expensive, provide optimum appearance, durability, strength, and barrier properties. In the case of laminated prints, the structure is shown in FIG. 2. In this structure the inks are sandwiched between two films. This means only the OPV/CSRL comes into direct contact with the cohesive/adhesive in the rewind. In most cases, the substrate that the cold seal cohesive is applied to is compositionally different than the substrate that the cold seal release lacquer is applied to. The CSRL's of the present invention are useful in either structure.

The films, in conjunction with the CSRL's of the present invention, would preferably provide sufficient release properties without any ink transfer. For surface printing, the release and ink transfer results are both required to determine the success of the OPV/CSRL, while only the release scale is required for laminated structures.

Laminated structures are seldom recyclable because the two different substrates would be required to be separated prior to the recycling process. However, if each substrate was compostable, the laminate packaging could be considered compostable.

When attempting to optimize the cold seal for a particular application, one should remember that there is more than one way for a cold seal to peel apart. In some cases, the bond between the cohesive and the lacquer will be stronger than the bond between the lacquer and the substrate, ink or coating to which it has been applied. In such cases, when the seal opens, the lacquer leaves the substrate to which it was applied and stays with the cohesive. On the other hand, if the bond between the lacquer and the cohesive is the weaker bond, the seal would open by separating the cohesive from the lacquer.

EXAMPLES

The invention is further described by the following non-limiting examples which further illustrate the invention, and are not intended, nor should they be interpreted, to limit the scope of the invention.

Coefficient of Friction

Coefficient of Friction was measured using a TMI 32-07-00-0001 Monitor/Slip tester (Testing Machines Inc.) with a 2.5 inch by 2.5 inch, 200 gram sled, using a sled speed set at 6.0 inches/minute and a sweep length of five inches. Coefficient of friction is the ratio of the force typically measured in Newtons, required to move an object divided by the force of friction resisting the movement. Values demonstrate the friction between two objects, in this case two coated surfaces. The static value is the ratio to initially move the sled, the kinetic value is the ratio to keep the sled in motion at a prescribed constant speed. When the coefficient of friction is evaluated the static and kinetic frictions are both recorded.

Strength of Seal

An INSTRON Model 5542 Tensile Tester using a 100N static load cell and INSTRON BLUEHILL 3 software was used to measure the force needed to separate the cold seal samples by pulling the two substrates bound by the cold seal apart. T-Peel technique was used during testing and the average of the values taken over the pull length of each sample was recorded. Release testing (Cohesive bonded under pressure to Release Lacquer) was conducted over a pull length of 2 inches, while bond strength (Cohesive bonded to Cohesive) was tested over 2.5 inches.

For Release testing, a sample according to that of FIG. 1 was prepared. The primer depicted in FIG. 1 is optional and generally avoided unless needed. The release layer and the cohesive layer are brought into contact with each other, and then subjected to pressure and typically high temperatures and/or humidity in a block tester for a designated time, unless otherwise designated the conditions used for block testing herein were 120° F./80% RH/50 PSI for 4 weeks. The samples are cut into strips, typically about 1" wide. The strips are then cut in the middle, away from the seal, so that a top film portion of the laminate is separate from a bottom film portion of the laminate. The separated top and bottom portions of the laminate are clamped into opposing sides of the INSTRON Model 5542, and the peel test method is selected on the INSTRON BLUEHILL 3 program.

For (Cohesive/Cohesive) bond strength, a print with the cold seal cohesive was removed from the block tester and folded onto itself so that it was at least 1 inch wide and 2.5 inches in length. The cold seal cohesive structure was stamped at 80 PSI at room temperature with a Sencorp heat sealer model 12-ASL before being peeled apart using the INSTRON as above. A "green", i.e., unaged, bond strength was evaluated before aging, and a sample of the same composition was tested in this manner after aging.

To prepare the samples used test the bond strength of the cold seal bonds, cold seal constructs were exposed to various temperatures and humidities while under pressure from the Sun air driven piston Block Tester. The block tester compresses the cold seal by pressing the two substrates held together by the seal toward each other, with the seal in between. After the selected time the seal is pulled apart and factors such as the bond strength, ink transfer and the like can be determined. Examples of block test conditions include, but are not limited to, a 16-hour test at 100 PSI, ambient temperature and humidity, a 16-hour test at 100 PSI, 120° F. and ambient humidity, as well as 2-week, 4-week, and 6-week tests at 50° PSI, 120F and 80% relative humidity. Unless otherwise designated, the block testing conditions used in the Examples were 120° F./80% RH/50 PSI for 4 weeks.

TABLE 1

Release Bond Strength Scale

| Scale | Description | Bond Strength Values |
|---|---|---|
| 1 | Very Minimal Effort | <25 g/in |
| 2 | Minimal Effort | 25-39 g/in |
| 3 | Moderate Effort | 40-50 g/in |
| 4 | Heavy Effort | 51-100 g/in |
| 5 | Extreme Effort | >100 g/in |

In the present Examples, prints the size of the block tester plates, 2 inches by 4 inches, were mounted in the air driven block tester engineered by Sun Chemical and heated at 120° F. under 80% RH and 50 PSI for 4 weeks. The prints were evaluated using the INSTRON above for CS-CSRL release and cohesive bond strength, and evaluated visually for ink transfer.

In evaluating ink transfer, prints were printed to match a visual target color strength determined by the manufacturer of the cold seal article. The overall graphics of the package must meet the manufacturer's expectations. It's important to test the structure within the selected target color strength of the ink so that testing the ink transfer can be conducted accurately and consistently. Color strength was measured with an X-Rite eXact Spectrodensitometer serial number 036545 using a D-50 light source and a 2-degree reference angle. Color strength is measured by density. In the present Examples color strength was 1.72.

TABLE 2

Ink transfer scale after block testing

| Scale | Description |
|---|---|
| 1 | Non-Visible |
| 2 | Minimal |
| 3 | Moderate |
| 4 | Severe |

Nonvisible (1) to minimal (2) are acceptable results for ink transfer on CSRL structures.

Aging

In the invention, the cold seal release lacquer and the cohesive form a bond sealing two portions of the substrate under ambient conditions. According to the invention, the strength of this bond, after being aged for 4-weeks at 120° F., 80% RH and 50 PSI, is at least 80% of the value of the bond when formed, as measured by an air driven piston Block Tester. The air driven blocktester used here is a Sun Chemical designed piece of equipment which uses a pneumatic piston which pressurizes printed samples between two 2"×4" metal plates.

Preparation of Print/Cold Seal Samples

The printed samples were prepared using 335 NVS film (Futamura), a CSRL selected from one of the Examples above and Solimax AP Black printing ink (Sun Chemical) applied to one side of the film and a conventional non-compostable cohesive applied to the opposite side. Application of the ink, lacquer and cohesive to the 335 NVS film was performed using a Harper Flexo Proofer, followed by drying in an oven at 150° F. for thirty seconds. The samples were then held at room temperature for fifteen minutes before evaluation.

Print Sample for Evaluating Surface Printing

To prepare a print sample for evaluating the invention for surface printing, an ink composition, Solimax AP Black (Sun Chemical), was reduced to about 28-32 seconds in a #2-EZ Zahn cup before being applied on the higher surface energy side of the film (print-side) to a visual target color strength using a 3.2 BCM anilox. The visual target color strength is determined by the manufacturer of the cold seal article. The overall graphics of the package must meet the manufacturer's expectations. It's important to test the structure within the selected target color strength of the ink so that testing the ink transfer can be conducted accurately and consistently.

A cold seal release lacquer of Example 1 through 11 was likewise reduced to about 28-32 seconds in a #2-EZ Zahn cup before being applied on top of the ink at approximately 1.63 gsm. A conventional non-compostable cohesive was applied at approximately 5.71 gsm to the opposite, non-print side of the same film or a different film. Although the cohesive used in the present examples was LOCTITE CS 7420 from Henkel, any cohesive, preferably a compostable cohesive, can be used.

The Coating weight/density reported in these Examples is dry coating weight determined by the subtractive method. The subtractive method is conducted by making a print on foil then drying it in the oven at 150° F. for thirty seconds, then allowing it to stand at room temperature for fifteen minutes and then cutting to a 2×4 inch rectangle. The cut sample was first weighed with a scale then the coating is removed with the appropriate solvent before being reweighed. The change in weight is then calculated with formula below to find grams per square meter (gsm).

(Change in weight (g)/8.0 sq. in.)×(12 in./1 ft)×(12 in/1 ft.)×(10.76 sq. ft./1 sq. m.)=g/sq. m (gsm)

Print Sample for Evaluating Laminate Printing

No ink was used in the laminate printing samples. As above, a cold seal release lacquer from Examples 1 through 11 was reduced to about 28-32 seconds on a #2-EZ Zahn cup before being applied at approximately 1.63 gsm on the higher surface energy side of the film. A conventional non-compostable cohesive was applied at approximately 5.71 gsm to the opposite, non-print side of the same film or a different film.

Cold Seal/Release Lacquer Evaluation

After drying, the print samples were evaluated for Coefficient of Friction, release, ink transfer, mode of failure and bond strength. Preferred performance ranges include minimal or no ink transfer from the ink and CSRL structure onto the cold seal cohesive structure, a release value (the force required to separate the CS/CSRL seal) at or below 3, destruct in the cold seal cohesive bonds, and minimal no loss of cold seal cohesive bond strength.

TABLE 1

Release Bond Strength Scale

| Scale | Description | Bond Strength Values |
|---|---|---|
| 1 | Very Minimal Effort | <25 g/in |
| 2 | Minimal Effort | 25-39 g/in |
| 3 | Moderate Effort | 40-50 g/in |
| 4 | Heavy Effort | 51-100 g/in |
| 5 | Extreme Effort | >100 g/in |

For surface printed structures, the ink transfer was evaluated by visual examination to determine how much ink transferred from the CSRL structure onto the cold seal cohesive layer using the Ink Transfer Scale below, Table 2.

TABLE 2

Ink transfer scale after block testing

| Scale | Description |
|---|---|
| 1 | Non-Visible |
| 2 | Minimal |
| 3 | Moderate |
| 4 | Severe |

Nonvisible (1) to minimal (2) are acceptable results for ink transfer on CSRL structures.

For the cohesive bond strength (CS-CS) evaluation, a print with the cold seal cohesive was removed from the block tester and folded onto itself to make sure it was at least 1 inch wide and 2.5 inches in length. The cold seal cohesive structure was stamped at 80 PSI at room temperature with a Sencorp heat sealer model 12-ASL before being pulled apart using the Instron to obtain the "green" or unaged bond strength. The aged print bonds are then compared to the green bonds. The cold seal release lacquer is deemed acceptable if the aged bond strength exhibits no more than a 20% loss of bond strength vs. green; more preferably the bond strength after block testing would be equal to or higher than the green bond strength.

Examples 1-11: Preparation of Release Lacquers

A series of release lacquers were prepared by mixing the formulations of Examples 1-11 by ordinary means. Examples 1 and 2 are lacquers containing resin, wax and solvent.

TABLE A

CSRL Examples (values are wt. percentages)

| Material | Ex. 1 | Ex. 2 |
|---|---|---|
| Vegechem[1] V930 | 0 | 0 |
| Vegechem V940 | 0 | 44.66 |
| Vegechem V757 | 35.8 | 0 |
| Unirez 2930 | 0 | 0 |
| S-Nauba[2] 50212 | 3 | 3 |
| Ethanol | 30.6 | 26.17 |
| n-propyl alcohol | 0 | 0 |

TABLE A-continued

| CSRL Examples (values are wt. percentages) | | |
| --- | --- | --- |
| Material | Ex. 1 | Ex. 2 |
| Water | 0 | 0 |
| Heptane | 30.6 | 26.17 |
| VM&P Naphtha | 0 | 0 |
| Total | 100 | 100 |

[1]Vegechem (Tsuno Rice Fine Chemicals Co., Ltd.) is the trade name of a series of biobased polyamide resins.
[2]S-Nauba 5021 (Shamrock) is a concentrated blend of carnauba and synthetic wax.

Examples 3-7 compare levels of wax content.

TABLE B

| CSRL Examples, Wax Content Evaluation | | | | | |
| --- | --- | --- | --- | --- | --- |
| Material | Ex. 3 | Ex. 4 | Ex. 5 | Ex. 6 | Ex. 7 |
| Vegechem V930 | 45.8 | 45.6 | 45.12 | 44.66 | 36.4 |
| Vegechem V940 | 0 | 0 | 0 | 0 | 0 |
| Vegechem V757 | 0 | 0 | 0 | 0 | 0 |
| Unirez 2930 | 0 | 0 | 0 | 0 | 0 |
| S-Nauba[2] 50212 | 0.5 | 1 | 2 | 3 | 2 |
| Ethanol | 26.85 | 26.7 | 26.44 | 26.17 | 0 |
| n-propyl alcohol | 0 | 0 | 0 | 0 | 30.3 |
| Water | 0 | 0 | 0 | 0 | 1 |
| Heptane | 26.85 | 26.7 | 26.44 | 26.17 | 15.3 |
| VM&P Naphtha | 0 | 0 | 0 | 0 | 15 |
| Total | 100 | 100 | 100 | 100 | 100 |

Examples 8-11 were formulated with an adhesion promoter.

TABLE C

| CSRL Examples, Adhesion Promoter Evaluation | | | | |
| --- | --- | --- | --- | --- |
| Material | Ex. 8 | Ex. 9 | Ex. 10 | Ex. 11 |
| Vegechem V930 | 0 | 34.2 | 0 | 40.5 |
| Vegechem V940 | 0 | 0 | 0 | 0 |
| Vegechem V757 | 0 | 0 | 0 | 0 |
| Unirez 2930 | 36.4 | 0 | 31.2 | 0 |
| S-Nauba[2] 50212 | 2 | 2 | 1.75 | 1.75 |
| Ethanol | 0 | 0 | 0 | 0 |
| n-propyl alcohol | 30.3 | 30.3 | 33.5 | 26.5 |
| Water | 1 | 1 | 0.9 | 0.9 |
| Heptane | 15.3 | 15.3 | 18.55 | 17.5 |
| VM&P Naphtha | 15 | 15 | 13.25 | 12 |
| * Adhesion Promoter | 0 | 2.2 | 0.85 | 0.85 |
| Total | 100 | 100 | 100 | 100 |

* Phosphate modified isopropyl titanate.

TABLE D

| Bio-based carbon content of raw materials and finished examples | |
| --- | --- |
| Component | Bio-Based Carbon (%) |
| Vegechem V930 | 97.00 |
| Unirez 2930 | 98.00 |
| S-Nauba 50212 | 81.00 |
| Sun Adhesion Promoter | 0.00 |
| Example 5 | 94.00 |
| Example 10 | 96.00 |
| Example 11 | 97.00 |

Evaluation of Compostability

As explained above, to meet ASTM D6400 standard for compostability, equal to or greater than 90% of the organic carbon must convert to $CO_2$ within 180 days of composting—put another way, less than or equal to 10% of the original organic carbon can be recoverable after testing. The lacquer of Example 10 contains components that are less than 90% biobased carbon, however the complete coating is 96% biobased carbon. The S-Nauba 50212 is 1.75% of the overall formula so under ASTM D6400 guidelines must be tested for inherent biodegradation (ASTM 6866-20). It was determined to be 81% biobased carbon. There is also 0.85% Sun adhesion promoter but since it is found to be <1% of the overall formula it is exempt from testing under ASTM D6400 guidelines. In this case however it was submitted for inherent biodegradation and found to be 0% biobased carbon. Even if the solvents were 0% biobased carbon, they are not considered part of the final structure due to evaporation and are thus exempt from ASTM D6400 testing. A sample of Example 10 was submitted to a testing facility of the Compost Manufacturing Alliance. The sample was tested using the CG98 test method wherein the lacquer of Example 10 was applied to a NVS a cellulosic film to generate a coated structure, and the coated structure was composted for 180 days. Less than 5% of the original organic carbon was recovered at the end of the 180 day testing period—that is, more than 95% of the organic carbon was converted to $CO_2$. This shows that the CSRL of Example 10, upon the structure on which the coating was applied, and at the coat weight applied, did disintegrate in the field and did not hinder the disintegration of the structure. Thus, CSRL of Example 10 biodegraded under composting conditions, meeting at least some of the conditions for being fully compostable. Coating samples of Example 10 have been submitted and full ASTM D6400 testing continues. Certification and results are pending. However, based on the ASTM D6866-20 and CG98 testing done to date, Example 10 meets the conditions stated under ASTM D6400.

Example 12. Testing of Print Samples

Print samples were prepared and tested as described above. The results are shown in Tables 3-7.

Table 3 shows the results from a surface printing sample using the CSRL of Example 5. Shown are the force required to separate the Cohesive and the Release Lacquer, the level of ink transfer and the cold seal bond strength after aging 4-weeks in Block Tester at 120° F./80% RH/50 PSI, and the initial cold seal bond strength.

TABLE 3

| Green and Aged, Compostable CSRL (Example 5) Surface Print Evaluation | | |
| --- | --- | --- |
| | CS-CSRL Release Bond Strength | Ink Transfer | CS-CS Bonds (g/in) |
| Green | N/A | N/A | 110.04 |
| Aged* | 2 (36.00 g/in) | 1 | 156.06 |

*Aged 4-weeks in Block Test at 120 F./80% RH/50 PSI

Table 4 shows the results from a laminate printing sample using the CSRL of Example 10. Shown are the force required to separate the Cohesive and the Release Lacquer and the cold seal bond strength after aging 4-weeks in Block Tester at 120° F./80% RH/50 PSI, and the initial cold seal bond strength

TABLE 4

Green and Aged CSRL (Example 10) Laminated Print Evaluation

|  | CS-CSRL Release Bond Strength | CS-CS Bonds (g/in) |
|---|---|---|
| Green | N/A | 173.30 |
| Aged* | 3 (44.90 g/in) | 168.60 |

*Aged 4-weeks in Block Test at 120 F./80% RH/50 PSI

Table 5 shows the results of 3 CoF test runs and the average result obtained from a sample made by applying the CSRL of Example 7 to a 335 NVS film.

TABLE 5

CoF Results of Example 7 Compostable CSRL over NVS

|  | 1 | 2 | 3 | Average |
|---|---|---|---|---|
| Static | 0.47 | 0.54 | 0.58 | 0.53 |
| Kinetic | 0.30 | 0.30 | 0.31 | 0.30 |

Table 6 shows the results of 3 CoF test runs and the average result obtained from a sample made by applying the CSRL of Example 10 to a 335 NVS film

TABLE 6

CoF Results of Example 10 Compostable CSRL over NVS

|  | 1 | 2 | 3 | Average |
|---|---|---|---|---|
| Static | 0.36 | 0.48 | 0.39 | 0.41 |
| Kinetic | 0.27 | 0.31 | 0.29 | 0.29 |

Example 1, formulated with Vegechem V757 release value was graded as a 4 and was not considered optimal for the main embodiments of the invention, however it is certainly of value in other embodiments where a slightly higher release value is desirable. Also, slight reformulation is likely to produce a fully acceptable lacquer using this resin.

Example 2, as formulated with Vegechem V940 and the current wax additive S-Nauba 5021, was not tested further as the resin was incompatible with S-Nauba 5021, although using a different wax could make Vegechem V940 a viable option for the present invention.

Vegechem V930, examples 3-7, 9 and 11, was found to be a very effective biobased polyamide in the invention as it imparted the desirable properties and was compatible with the preferred wax.

In Example 10, polyamide Unirez 2930 was also very effective and found to be comparable to Vegechem V930 when evaluated against previous examples.

Examples 3-7, performed well and are viable options for surface printing, but would require a primer for lamination prints to boost adhesion to the film without disrupting CS-CS bonds. Example 7 was tested over a primer. To avoid the complications and extra steps involved with a primer layer, Examples 8-11 were formulated with the adhesion promoter above making them useful for both surface and laminated structures without primer.

The adhesion promoter enhances the overall adhesion of the CSRL to the substrate allowing for the structure to be manufactured without the use of a primer. Eliminating the primer can improve the compostability of the overall structure. Also, eliminating the primer will streamline manufacturing by reducing the overall number of print decks required on the printing press, which will increase the number of colors available in the graphics. Other adhesion promoters might be applicable but will require different concentration ranges. The high end of the preferred range is the theoretical limit to allow for the coating to maintain its compostability status minus a buffer to allow for manufacturing variability. For the adhesion promoter used in table C, the theoretical limit is 0.998%. The preferable range is 0.50-0.85%.

Since all of the materials used in the CSRL's of the present invention are compostable, it is clear that the CSRL's themselves would also be compostable.

The present invention has been described in detail, including the preferred embodiments thereof. However, it will be appreciated that those skilled in the art, upon consideration of the present disclosure, may make modifications and/or improvements on this invention that fall within the scope and spirit of the invention.

The invention claimed is:

1. A solvent-based cold seal release lacquer comprising:
   a) one or more solvents;
   b) from 20 wt % to 70 wt % of one or more polyamide resins comprising greater than 90% biobased carbon, reported as a percentage of the total carbon that is carbon derived from plant or animal by-products; and
   c) from 0.25 wt % to 5 wt % of one or more waxes, wherein the one or one or more waxes comprise greater than 70% biobased carbon, reported as a percentage of the total carbon that is carbon derived from plant or animal by-products;
wherein the cold seal release lacquer has a static coefficient of friction ($CoF_{static}$) of 0.35-0.50; a kinetic coefficient of friction ($CoF_{kinetic}$) of 0.20-0.35; wherein the cold seal release lacquer, when dried, comprises greater than 90% biobased carbon, reported as a percentage of the total carbon that is carbon derived from plant or animal by-products and meets the ASTM D6400 standard for compostability, wherein equal to or greater than 90% of the biobased carbon converts to $CO_2$ within 180 days of composting; and wherein the cold seal release lacquer comprises from 0 to 1 wt % water.

2. The cold seal release lacquer according to claim 1 wherein the one or more solvents are chosen from the group consisting of alcohols, aliphatic solvents, glycol ethers and blends thereof.

3. The cold seal release lacquer according to claim 1, wherein the one or more polyamide resins are derived from rice oil or rice bran and/or wherein the one or more polyamide resins are compostable.

4. A structure comprising a substrate, a cohesive and a solvent-based cold seal release lacquer comprising:
   a) one or more solvents;
   b) from 20 wt % to 70 wt % of one or more polyamide resins comprising greater than 90% biobased carbon, reported as a percentage of the total carbon that is carbon derived from plant or animal by-products; and
   c) from 0.25 wt % to 5 wt % of one or more waxes;
wherein the cold seal release lacquer has a static coefficient of friction ($CoF_{static}$) of 0.35-0.50; a kinetic coefficient of friction ($CoF_{kinetic}$) of 0.20-0.35; wherein the cold seal release lacquer, when dried, comprises greater than 90% biobased carbon, reported as a percentage of the total carbon that is carbon derived from plant or animal by-products and meets the ASTM D6400 standard for compostability, wherein equal to or greater than 90% of the biobased carbon converts to $CO_2$ within 180 days of composting; and wherein the cold seal release lacquer comprises from 0 to 1 wt % water.

5. The structure according to claim 4, wherein the substrate is printed with an ink, either directly onto a surface of the substrate or onto a primer layer adhering to a surface of the substrate.

6. The structure according to claim 4, wherein the substrate is a film.

7. The structure according to claim 6, wherein the substrate is a cellulosic film.

8. The structure according to claim 5, wherein the substrate, the ink and the cohesive are also compostable.

9. The structure according to claim 5, wherein a laminating substrate is positioned over the ink.

10. The structure according to claim 9, wherein the cold seal release lacquer is positioned over the laminating substrate.

11. The structure according to claim 4, wherein the cold seal release lacquer and the cohesive can form a bond sealing two portions of the substrate under ambient conditions, wherein the strength of the bond, after being aged for 4-weeks at 120° F., 80% RH and 50 PSI, is at least 80% of the value of the bond when formed, as measured by an air driven piston Block Tester.

12. The structure according to claim 9, wherein the entire structure is compostable.

13. A method of providing a compostable cold seal structure comprising the steps of: applying a compostable adhesive to a surface of a compostable packaging substrate, and applying a solvent-based compostable cold seal release lacquer to a second surface of the same substrate or a surface of a second compostable packaging substrate, wherein the cohesive and compostable cold seal release lacquer form a seal under pressure, which seal is readily opened, wherein a solvent-based compostable cold seal release lacquer comprises:
 a) one or more solvents;
 b) from 20 wt % to 70 wt % of one or more polyamide resins comprising greater than 90% biobased carbon, reported as a percentage of the total carbon that is carbon derived from plant or animal by-products; and
 c) from 0.25 wt % to 5 wt % of one or more waxes;

wherein the cold seal release lacquer has a static coefficient of friction ($CoF_{static}$) of 0.35-0.50; a kinetic coefficient of friction ($CoF_{kinetic}$) of 0.20-0.35; wherein the cold seal release lacquer, when dried, comprises greater than 90% biobased carbon, reported as a percentage of the total carbon that is carbon derived from plant or animal by-products and meets the ASTM D6400 standard for compostability, wherein equal to or greater than 90% of the biobased carbon converts to $CO_2$ within 180 days of composting; and wherein the cold seal release lacquer comprises from 0 to 1 wt % water.

14. The structure according to 4, wherein the one or more solvents are chosen from the group consisting of alcohols, aliphatic solvents, glycol ethers and blends thereof.

15. The structure according to 14, wherein the one or more polyamide resins are derived from rice oil or rice bran and/or wherein the one or more polyamide resins are compostable.

16. The structure according to claim 14, wherein the one or one or more waxes comprise greater than 70% biobased carbon, reported as a percentage of the total carbon that is carbon derived from plant or animal by-products.

17. The method of claim 13, wherein the one or more solvents of the solvent-based compostable cold seal release lacquer are chosen from the group consisting of alcohols, aliphatic solvents, glycol ethers and blends thereof.

18. The method of claim 13, wherein the one or more polyamide resins are derived from rice oil or rice bran and/or wherein the one or more polyamide resins are compostable.

19. The method of claim 13, wherein the one or one or more waxes comprise greater than 70% biobased carbon, reported as a percentage of the total carbon that is carbon derived from plant or animal by-products.

20. The cold seal release lacquer according to claim 1 wherein the cold seal release lacquer comprises an adhesion promoter.

21. The cold seal release lacquer according to claim 20, wherein the adhesion promoter is present in an amount of 0.2-0.85 wt %.

22. The cold seal release lacquer according to claim 20, wherein the adhesion promoter comprises a phosphate modified isopropyl titanate.

* * * * *